United States Patent
Li

(10) Patent No.: US 7,929,680 B2
(45) Date of Patent: Apr. 19, 2011

(54) METHOD AND SYSTEM FOR ENABLING ORIGINATING AND DESTINATION TELEPHONES TO CONDUCT A CALL SESSION

(75) Inventor: Shin-Shian Li, Taiwan (TW)

(73) Assignee: Panasonic Corporation, Osaka (JP)

( * ) Notice: Subject to any disclaimer, the term of this patent is extended or adjusted under 35 U.S.C. 154(b) by 880 days.

(21) Appl. No.: 11/909,176

(22) PCT Filed: Mar. 16, 2006

(86) PCT No.: PCT/JP2006/305757
§ 371 (c)(1),
(2), (4) Date: Sep. 20, 2007

(87) PCT Pub. No.: WO2006/101148
PCT Pub. Date: Sep. 28, 2006

(65) Prior Publication Data
US 2009/0052649 A1 Feb. 26, 2009

(30) Foreign Application Priority Data

Mar. 21, 2005 (CN) .......................... 2005 1 0055951

(51) Int. Cl.
*H04M 3/42* (2006.01)
(52) U.S. Cl. ................ 379/211.02; 379/212.01
(58) Field of Classification Search ............. 379/211.02, 379/212.01, 201.01
See application file for complete search history.

(56) References Cited

U.S. PATENT DOCUMENTS

| 6,061,571 A | 5/2000 | Tamura |
| 2003/0017824 A1 | 1/2003 | Uhlmann |
| 2003/0032410 A1 | 2/2003 | Saraswat |
| 2004/0151296 A1* | 8/2004 | Gamble .................... 379/218.01 |

FOREIGN PATENT DOCUMENTS

| CN | 1201317 | 12/1998 |
| EP | 0855822 | 7/1998 |
| EP | 0964564 | 12/1999 |

OTHER PUBLICATIONS

English language Abstract of CN 1201317, Dec. 9, 1998.

* cited by examiner

*Primary Examiner* — Creighton Smith
(74) *Attorney, Agent, or Firm* — Greenblum & Bernstein, P.L.C.

(57) ABSTRACT

A method for enabling originating and destination telephones to conduct a call session through an intermediary telephone includes the following steps: (A) enabling the originating telephone to send a query request to the intermediary telephone so as to search the intermediary telephone for contact information of the destination telephone; and (B) if the contact information of the destination telephone is available in the intermediary telephone, enabling the originating telephone to conduct the call session with the destination telephone using the contact information in the intermediary telephone. Applications of the method are also disclosed.

18 Claims, 11 Drawing Sheets

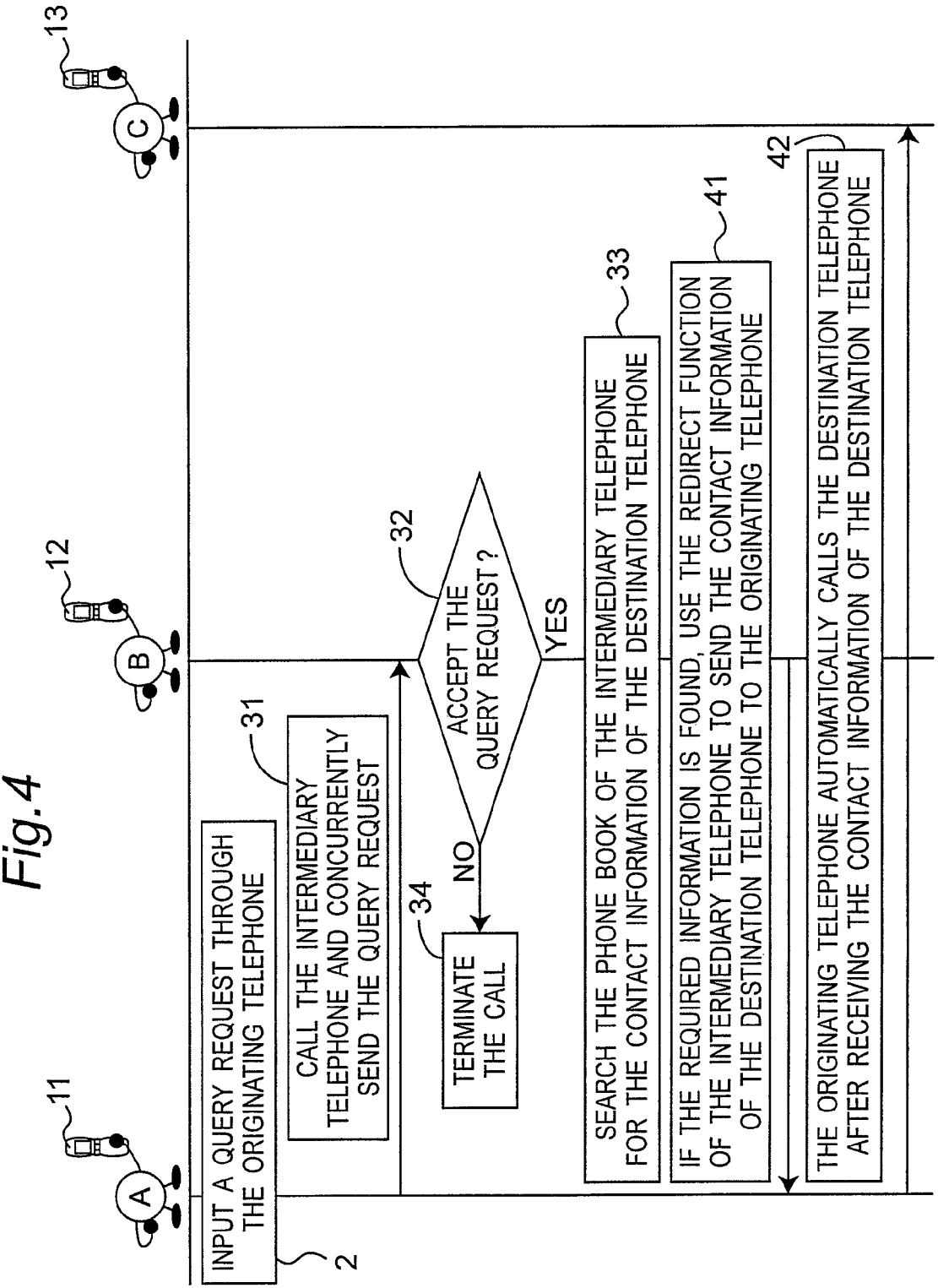

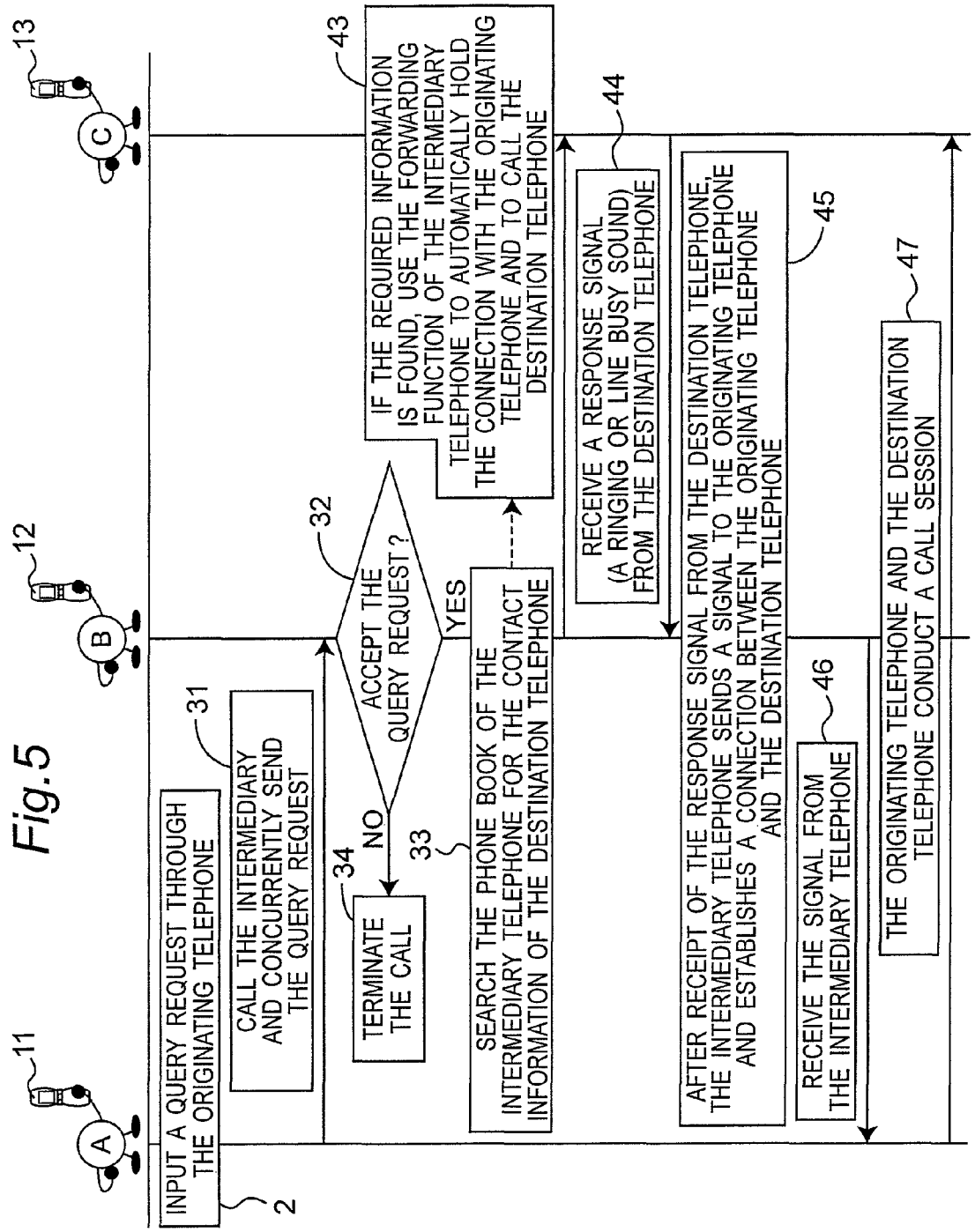

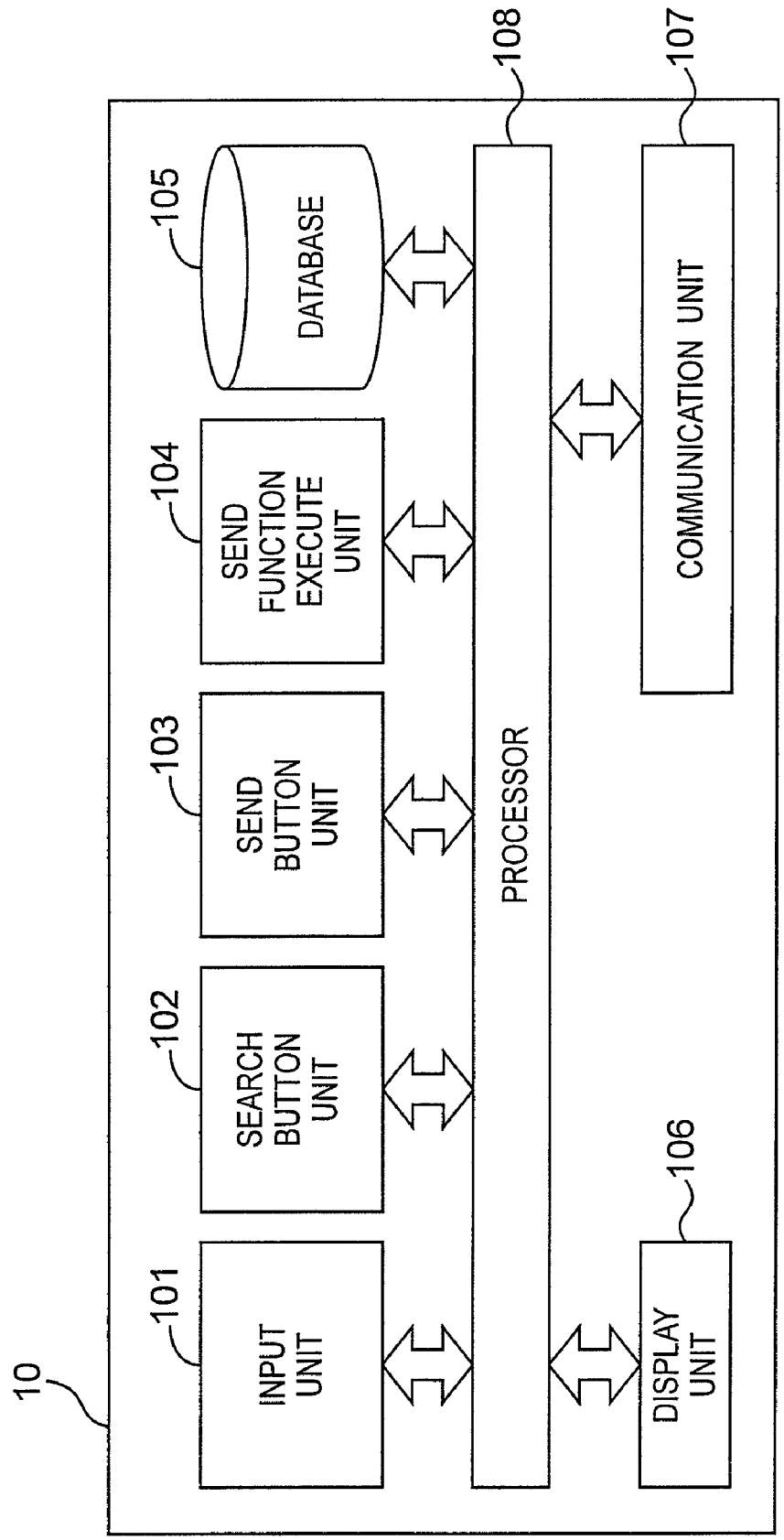

Fig. 13

```
INVITE sip:user1@example. com SIP/2.0
Via: SIP/2.0/UDP pc1. exam. com;branch=z9hG4bk776asdhds
Max-Forwards: 70
To: user1 <sip:user1@example. com>
From: user2 <sip:user2@exam. com>;tag=1928301774
Call-ID: a84b4c76e66710@pc1. exam. com
CSeq: 314159 INVITE
Subject: Samlee Query Request
Contact: <sip:user1@pc1. exam. com>
Content-Type: application/sdp
Content-Length: 142
```

Fig. 14

```
REFER user2@exam. com SIP/2.0
To: user2 <sip:user2@exam. com>;tag=a6c85cf
From: user1 <sip:user1@example. com>;tag=1928301778
Call-ID: a84b4c76e66710@pc1. exam. com
CSeq: 314159 INVITE
Refer-To: Samlee<samlee@example2. com>
Contact: <sip:user2@192. 0. 2. 4>
Content-Type: application/sdp
Content-Length: 131
```

METHOD AND SYSTEM FOR ENABLING ORIGINATING AND DESTINATION TELEPHONES TO CONDUCT A CALL SESSION

TECHNICAL FIELD

The invention relates to a method for enabling originating and destination telephones to conduct a call session, and an application thereof, more particularly to a method for enabling originating and destination telephones to conduct a call session through an intermediary telephone, and applications thereof.

BACKGROUND ART

With the popularity of telecommunications services, the telephone has become an important tool for communicating with others in everyday life. However, telephone users often encounter a common problem, i.e., they cannot find the telephone number of the person they want to call in their own personal phone book.

Under this circumstance, one often will call someone who may have the telephone number of the person one wants to call, or use the "Yellow Page" service or directory assistance service provided by most telecommunications service providers so as to obtain the required telephone number. After obtaining the required information, the information has to be memorized or written down on a piece of paper before dialing the telephone number to contact the party one intends to call. Such a method may work under most circumstances. However, something may go wrong, i.e., one may have written down or dialed a wrong number.

A US patent document, US20040151296A1 discloses a "Method and system for automatically sending, receiving and utilizing information transmitted over a communication network" to overcome the aforesaid problem. The aforesaid patent publication employs a telephone having a dual tone multi-frequency (DTMF) receiver and a directory assistance center. When the directory assistance center delivers a phone number in DTMF format, the user's telephone can automatically capture the DTMF signal, and stores and displays the captured information to enable the user to press corresponding keys to dial the phone number or to allow the telephone to automatically dial the phone number.

However, in order to implement the method described in the aforesaid U.S. patent publication, the user's telephone has to be equipped with a DTMF transceiver. In addition, there is a critical problem. That is, if the public service, such as the Yellow Page service and the directory assistance service, is not able to provide the required contact information, or the required contact information is available only to a few specific subscribers in view of privacy concerns, the user is unable to obtain the required information.

DISCLOSURE OF INVENTION

Therefore, an object of the present invention is to provide a method for enabling originating and destination telephones to conduct a call session through an intermediary telephone so that an originating user does not need to memorize or write down contact information of a destination user received from an intermediary user, and so that the originating user does not need to dial the telephone number of the destination user received from the intermediary user, thereby avoiding mis-dialing and thereby reducing telephone charges and calling time.

Accordingly, the method for enabling originating and destination telephones to conduct a call session through an intermediary telephone of the present invention includes the following steps. Initially, the originating telephone is operated to send a query request to the intermediary telephone so as to search the intermediary telephone for contact information of the destination telephone. Then, if the contact information of the destination telephone is available in the intermediary telephone, the originating telephone can conduct the call session with the destination telephone using the contact information in the intermediary telephone.

In addition, another object of the present invention is to provide a system for enabling originating and destination telephones to conduct a call session through an intermediary telephone so that an originating user does not need to memorize or write down contact information of a destination user received from an intermediary user, and so that the originating user does not need to normally dial the telephone number of the destination user received from the intermediary user, thereby avoiding mis-dialing and thereby reducing telephone charges and calling time.

Accordingly, the system for enabling originating and destination telephones to conduct a call session through an intermediary telephone of the present invention includes the destination telephone, the intermediary telephone, and the originating telephone. The intermediary telephone has the contact information of the destination telephone. The originating telephone is operable for inputting a query request and for calling the intermediary telephone so as to send the query request to the intermediary telephone to search the contact information of the destination telephone from the intermediary telephone, and for conducting the call session with the destination telephone based on the contact information thus found.

Further, still another object of the present invention is to provide a telephone instrument, which can serve as one of an originating telephone and an intermediary telephone in a system including the originating telephone, the intermediary telephone, and a destination telephone, so that an originating user does not need to memorize or write down contact information of a destination user received from an intermediary user, and so that the originating user does not need to manually dial the telephone number of the destination user received from the intermediary, thereby avoiding mis-dialing and thereby reducing telephone charges and calling time.

Accordingly, the telephone instrument of the present invention includes a processor, an input unit, a database, a search button unit, a display unit, a communication unit, a send button unit, and a send function execute unit. The input unit is used to input a query request sent to the processor of the intermediary telephone when the telephone instrument is used as the originating telephone, wherein the query request is used for inquiring whether contact information of the destination telephone is available in the intermediary telephone. The database stores the contact information of the destination telephone when the telephone instrument is used as the intermediary telephone. The search button unit is used to search the database in the intermediary telephone for the contact information of the destination telephone when the telephone instrument is used as the intermediary telephone. The display unit is used to receive and display the query request from the originating telephone when the telephone instrument is used as the intermediary telephone, and is used to display the contact information of the destination telephone after searching of the database of the intermediary telephone using the search button unit of the intermediary telephone when the telephone instrument is used as the intermediary telephone.

The send button unit is operable to send a send execute signal when the telephone instrument is used as the intermediary telephone. The send execute signal is one of a redirect execute signal and a forwarding execute signal. The send function execute unit is used to receive the send execute signal from the send button unit when the telephone instrument is used as the intermediary telephone. When the send execute signal is the redirect execute signal, the send function execute unit of the intermediary telephone sends the contact information of the destination telephone as stored in the database of the intermediary telephone to the originating telephone through the communication unit of the intermediary telephone, and the send function execute unit of the originating telephone receives the contact information of the destination telephone from the intermediary telephone through the communication unit of the originating telephone, and sends a first dialing phone signal to the communication unit of the originating telephone so as to call the destination telephone based on the contact information of the destination telephone. When the send execute signal is the forwarding execute signal, the send function execute unit of the intermediary telephone holds a connection with the originating telephone, obtains the contact information of the destination telephone as stored in the database of the intermediary telephone and as displayed on the display unit of the intermediary telephone, and sends a second dialing phone signal to the communication unit of the intermediary telephone to call the destination telephone, thereby setting up a call session between the destination telephone and the originating telephone.

BRIEF DESCRIPTION OF DRAWINGS

Other features and advantages of the present invention will become apparent in the following detailed description of the preferred embodiment with reference to the accompanying drawings, of which:

FIG. 4 is a flowchart illustrating a redirect mode in the preferred embodiment of the method according to the present invention;

FIG. 5 is a flowchart illustrating a forwarding mode in the preferred embodiment of the method according to the present invention;

FIG. 6 is a functional block diagram showing the telephone instrument of the present invention;

FIG. 13 is a schematic diagram illustrating an example of a request message sent by the originating telephone in the present invention; and FIG. 14 is a schematic diagram illustrating an example of a response message sent by the intermediary telephone in the present invention.

BEST MODE FOR CARRYING OUT THE INVENTION

Figure 1:
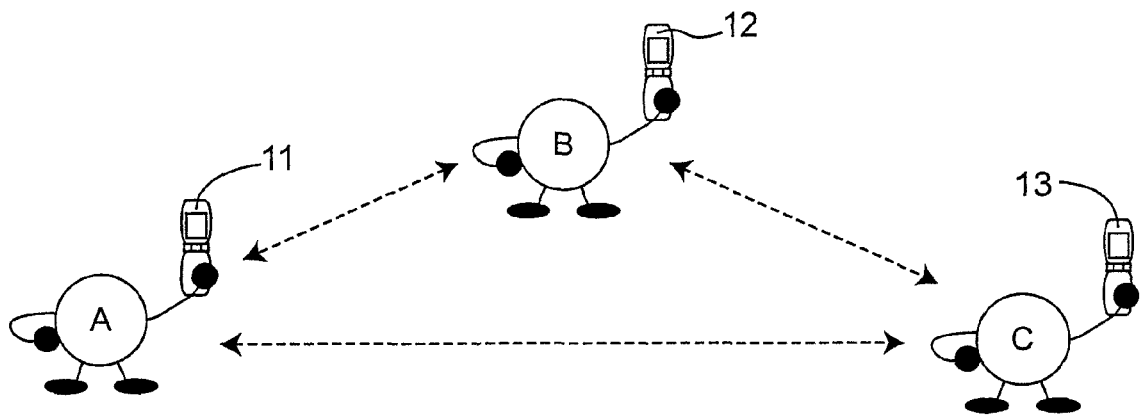
FIG. 1 is a schematic diagram illustrating a system for enabling originating and destination telephones to conduct a call session through an intermediary telephone according to the present invention.

Referring to FIG. 1, a system for enabling communication between originating and destination telephones through an intermediary telephone according to the present invention is shown to include the originating telephone 11, the intermediary telephone 12, and the destination telephone 13. FIG. 1 depicts a scenario in which an originating user A intends to use the originating telephone 11 to contact a destination user C through a network (not shown), but the originating telephone 11 does not have contact information (including the telephone number of the destination telephone 13) of the destination telephone 13 used by the destination user C. The network may be, e.g., the Internet, the Global System For Mobile Communications (GSM) network, the General Packet Radio Service (GPRS) network or a Third Generation (3G) network. However, if the intermediary telephone 12 of an intermediary user B has the contact information of the destination telephone 13, the originating user A can use the originating telephone 11 to input a query request (including a code of the destination telephone 13) and dial to the intermediary telephone 12 so as to send the query request to the intermediary telephone 12. Accordingly, the originating telephone 11 used by the originating user A can find the contact information of the destination telephone 13 from the intermediary telephone 12 used by the intermediary user B to so as to call the destination telephone 13 used by the destination user C.

Figure 2:
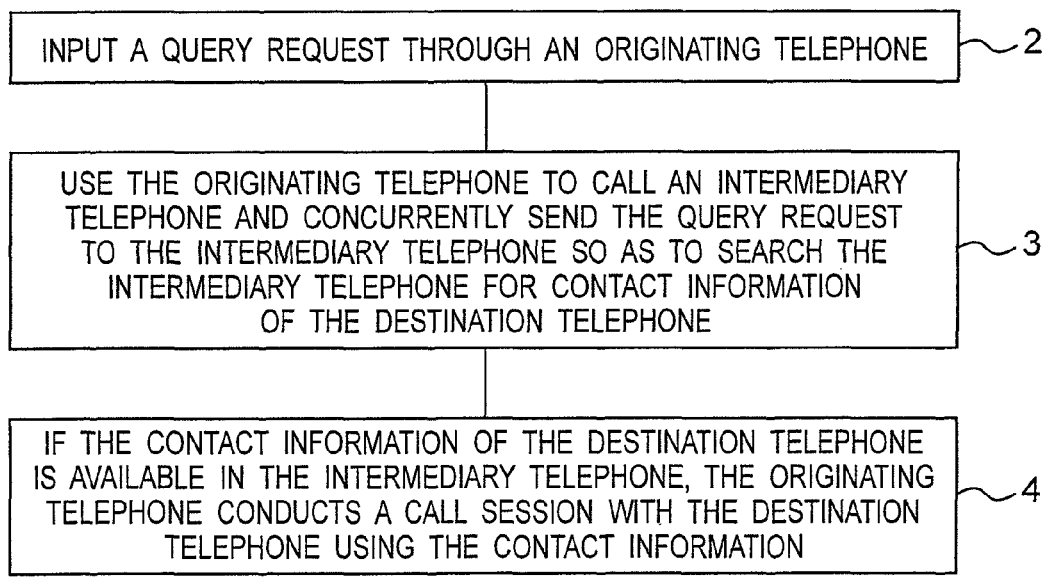
FIG. 2 is a flowchart illustrating the preferred embodiment of a method for enabling originating and destination telephones to conduct a call session through an intermediary telephone according to the present invention.

Referring to FIG. 2, the method for enabling originating and destination telephones to conduct a call session through an intermediary telephone according to the present invention is shown to include the following steps. Initially, in step 2, the originating user A inputs a query request through the originating telephone 11. Then, in step 3, the originating user A uses the originating telephone 11 to call the intermediary telephone 12 used by the intermediary user B, and concurrently sends the query request to the intermediary telephone 12 so as to search the intermediary telephone 12 for the contact information of the destination telephone 13 used by the destination user C. In step 4, if the contact information of the destination telephone 13 is available in the intermediary telephone 12, the originating user A can use the originating telephone 11 to conduct a call session with the destination telephone 13 used by the destination C based on the contact information available in the intermediary telephone 12.

Therefore, use of the aforesaid method and system of the present invention, as well as relevant applications thereof to be described in the succeeding paragraphs, will entail the following advantages. First, the originating user A does not need to memorize or write down the contact information of the destination user C received from the intermediary user b. Second, the originating user A does not need to manually dial the telephone number of the destination user C received from the intermediary user B, thereby avoiding mis-dialing and thereby reducing telephone charges and calling time.

Figure 3A:
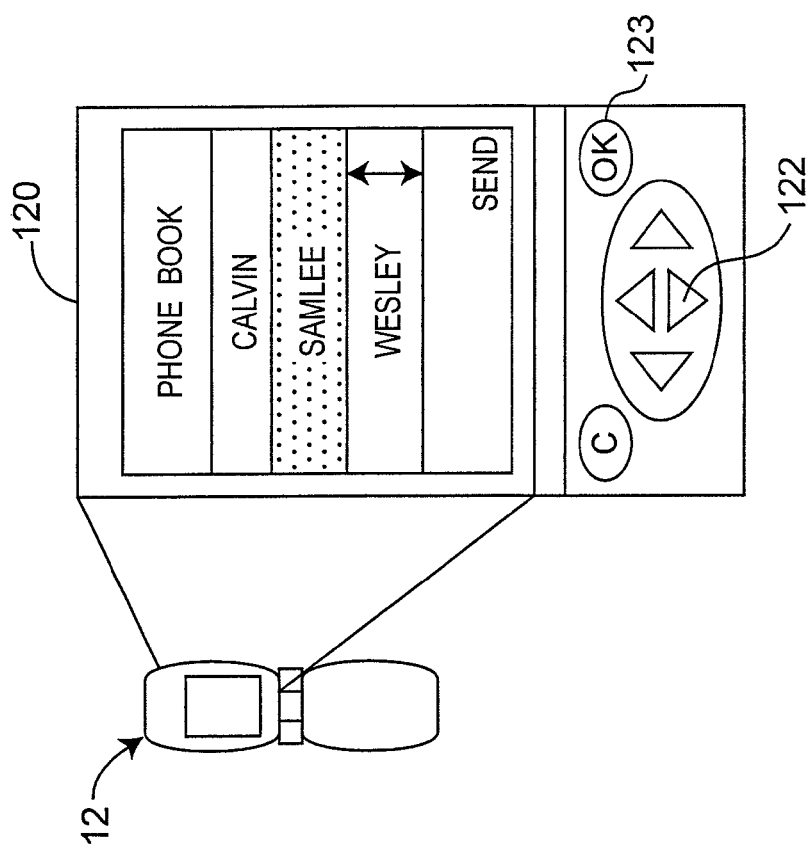
FIG. 3A is a schematic diagram illustrating an operation screen of a user interface of a telephone instrument according to the present invention.
Figure 3B:
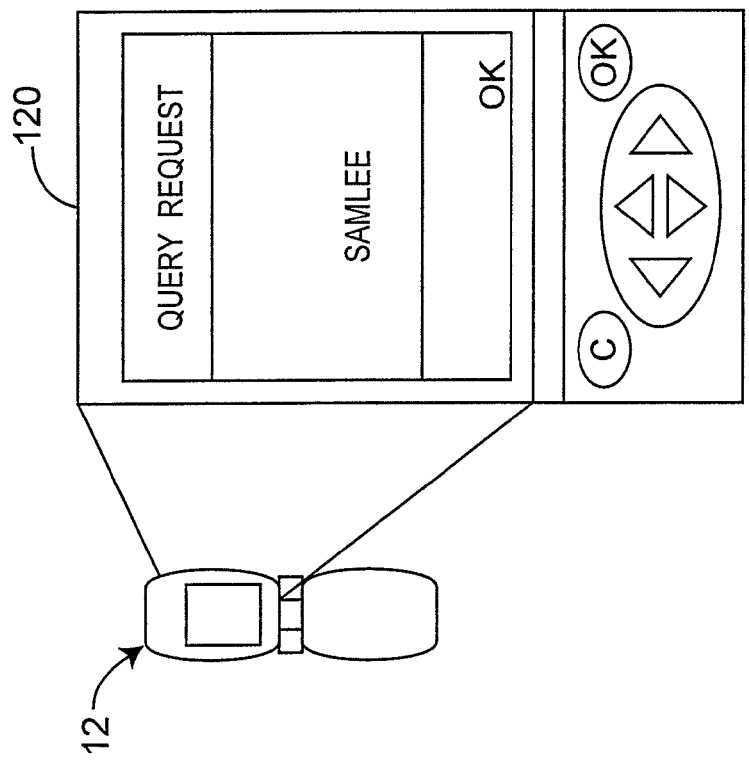
FIG. 3B is a schematic diagram illustrating another operation screen of the user interface of the telephone instrument according to the present invention.

Referring to FIGS. 3A and 3B, after the intermediary telephone 12 has received the query request from the originating telephone 11, as shown in FIG. 3A, a user interface 120 of the intermediary telephone 12 will first display the query request. Then, if the intermediary user B accepts the query request, a phone book of the intermediary telephone 12 will be displayed on the user interface 120 of the intermediary telephone 12, as shown in FIG. 3B. Next, by pressing a search button unit 122, the intermediary user B can find a code of the destination user C, e.g., Samlee, from the phone book of the intermediary telephone 12. The intermediary user B can then enter into a send function sub-menu (not shown) of the intermediary telephone 12 by pressing a send button unit 123. The send function sub-menu further includes two sub-options of "redirect" and "forwarding" for executing two different modes of the send function.

Referring to FIG. 4, a redirect mode of the method for conducting a call session between originating and destination telephones through an intermediary telephone of this invention includes the following complete steps. First, in step 2, the originating user A inputs a query request through the originating telephone 11. Then, in step 31, the originating user A uses the originating telephone 11 to call the intermediary telephone 12 used by the intermediary user B, and sends the query request to the intermediary telephone 12 concurrently. Next, in step 32, the intermediary user B decides whether or not to accept the query request. If the intermediary user B decides to accept the query request, in step 33, the intermediary user B searches the phone book of the intermediary telephone 12 for the contact information of the destination telephone 13 used by the destination user C. Otherwise, the call is terminated in step 34.

Subsequently, in step 41, if the intermediary user B finds the contact information of the destination telephone 13 from the phone book of the intermediary telephone 12, the intermediary user B uses the redirect function of the intermediary telephone 12 to send the contact information of the destination telephone 13 to the originating telephone 11. The contact information of the destination telephone 13 may be sent in the form of a Short Message Service (SMS), a Multimedia Message Service (MMS), an electronic mail, or DTMF. Then, in step 42, when the originating telephone 11 receives the contact information of the destination telephone 13 sent back by the intermediary telephone 12, the originating telephone 11 will automatically call the destination telephone 13, thereby setting up a direct call session between the originating telephone 11 and the destination telephone 13.

Referring to FIG. 5, a forwarding mode of the method for conducting a call session between originating and destination telephones through an intermediary telephone of this invention includes the following complete steps. Initially, in step 2, the originating user A inputs a query request through the originating telephone 11. Then, in step 31, the originating user A uses the originating telephone 11 to call the intermediary telephone 12 used by the intermediary user B, and sends the query request to the intermediary telephone 12 concurrently. Next, in step 32, the intermediary user B decides whether or not to accept the query request. If the intermediary user B decides to accept the query request, in step 33, the intermediary user B searches the phone book of the intermediary telephone 12 for the contact information of the destination telephone 13 used by the destination user C. Otherwise, the call is terminated in step 34.

Subsequently, in step 43, if the intermediary user B finds the contact information of the destination telephone 13 from the phone book of the intermediary telephone 12, the intermediary user B uses the forwarding function of the intermediary telephone 12 to automatically hold the connection with the originating telephone 11 and to call the destination telephone 13 used by the destination user C. Then, in step 44, the destination telephone 13 sends a response signal (a ringing or line busy sound) to the intermediary telephone 12. Next, in step 45, when the intermediary telephone 12 receives the response signal sent from the destination telephone 13, the intermediary telephone 12 sends a signal representing the ringing or line busy sound to the originating telephone 11, and establishes an indirect connection between the originating telephone 11 and the destination telephone 13. Accordingly, in step 46, the originating telephone 11 will receive the signal sent from the intermediary telephone 12. Then, in step 47, a call session can be conducted smoothly between the originating telephone 11 and the destination telephone 13.

Referring to FIGS. 1 and 6, the originating telephone 11 and the intermediary telephone 12 in the system of the present invention can be implemented using the telephone instrument 10 of the present invention shown in FIG. 6. The telephone instrument 10 includes an input unit 101, a search button unit 102, a send button unit 103, a send function execute unit 104, a database 105, a display unit 106, a communication unit 107, and a processor 108.

The input unit 101 is used to enable the originating user A to input a query request through the originating telephone 11, and sends the query request to the send function execute unit 104 and the display unit 106 through the processor 108, wherein the query request is used to inquire whether the contact information of the destination telephone 13 is available in the intermediary telephone 12.

The display unit 106 is used to display a character string of the query request received by the intermediary telephone 12, and to display the contact information of the destination telephone 13 when the database 105 of the intermediary telephone 12 is searched using the search button unit 102.

The database 105 is used to store personal information, such as contact information, of the telephone instrument 10, such as the telephone number of the telephone instrument 10 and a code of the user thereof.

The search button unit 102 allows the intermediary user B to search for the contact information of the destination telephone 13 from the database 105 of the intermediary telephone 12.

The send button unit 103 is pressable by the intermediary user B to send a send execute signal to the send function execute unit 104 of the intermediary telephone 12.

For the send function execute unit 104, it can execute different functions according to whether the send execute signal received thereby is a redirect execute signal or a forwarding execute signal.

When the redirect execute signal is received thereby, the send function execute unit 104 of the intermediary telephone 12 sends the contact information of the destination telephone 13 stored in the database 105 to the originating telephone 11 through the communication unit 107. Moreover, the send function execute unit 104 of the originating telephone 11 receives the contact information of the destination telephone 13 sent from the intermediary telephone 12 through the communication unit 107 thereof, and sends a first dialing phone signal to the send function execute unit 104 thereof so as to call the destination telephone 13 based on the contact information of the destination telephone 13. In addition, during the process of executing the "redirect" mode, the send function execute unit 104 of the originating telephone 11 can further send the contact information of the destination telephone 13 to the database 105 of the originating telephone 11 for storage therein.

When the forwarding execute signal is received thereby, the send function execute unit 104 of the intermediary telephone 12 will first automatically hold the connection with the originating telephone 11 and obtain the contact information of the destination telephone 13 sent from the database 105 and displayed on the display unit 106 of the intermediary telephone 12, and send a second dialing phone signal to the communication unit 107 of the intermediary telephone 12 so as to call the destination telephone 13. In addition, when the send function execute unit 104 of the intermediary telephone 12 receives a "call successful" or "call failed" signal from the communication unit 107 thereof, it will send the "call successful" or "call failed" signal to the originating telephone 11. Besides, the send function execute unit 104 can be further used to automatically set up a call session between the originating telephone 11 and the destination telephone 13.

The communication unit 107 can dial a telephone number according to the first dialing phone signal or the second dialing phone signal sent from the send function execute unit 104. The communication unit 107 can be further used to receive the "call successful" or "call failed" signal from another telephone. In addition, the communication unit 107 can be further used to send the "call successful" or "call failed" signal to the send function execute unit 104.

The processor 108 is used for transmitting signals among the aforesaid components 101~107 and for processing commands.

Figure 7:
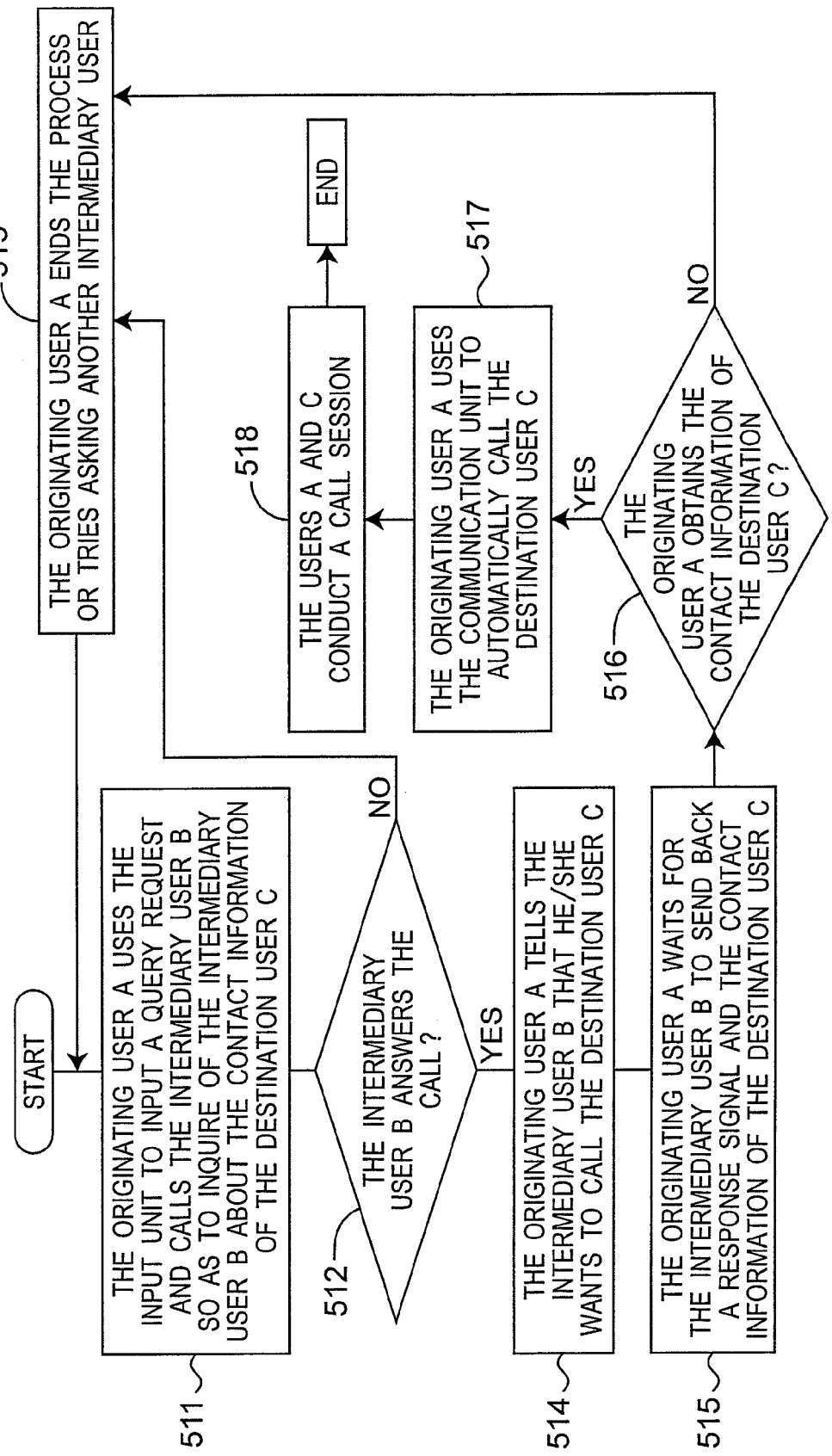
FIG. 7 is a flowchart illustrating the steps an originating user A needs to perform in the redirect mode.

Referring to FIGS. 1, 6 and 7, the steps which the originating user A needs to execute when the "redirect mode" of the present invention is selected are as follows. Initially, in step 511, the originating user A uses the input unit 101 of the originating telephone 11 to input a query request, and makes a call to the intermediary user B so as to inquire of the intermediary user B about the contact information of the destination user C. Then, in step 512, the originating user A waits for the intermediary user B to answer the call. If the intermediary user B does not answer the call, in step 513, the process is ended, or the originating user A tries asking another intermediary user. If the intermediary user B answers the call, in step 514, the originating user A can tell the intermediary user B in the query request that he/she wants to call the destination user C. Next, in step 515, the originating user A waits for the intermediary user B to send back a response signal and the contact information of the destination user C. Afterwards, in step 516, the originating user A determines whether the originating telephone 11 has received the contact information of the destination user C. If the originating user A does not receive the contact information of the destination user C, in step 513, the process is ended, or the originating user A tries asking another intermediary user. If the originating user A receives the contact information of the destination C from the intermediary user B, in step 517, the originating user A uses the communication unit 107 of the originating telephone 11 to automatically call the destination telephone 13 used by the destination user C. Accordingly, in step 518, the users A and C can conduct a telephone conversation smoothly.

Figure 8:
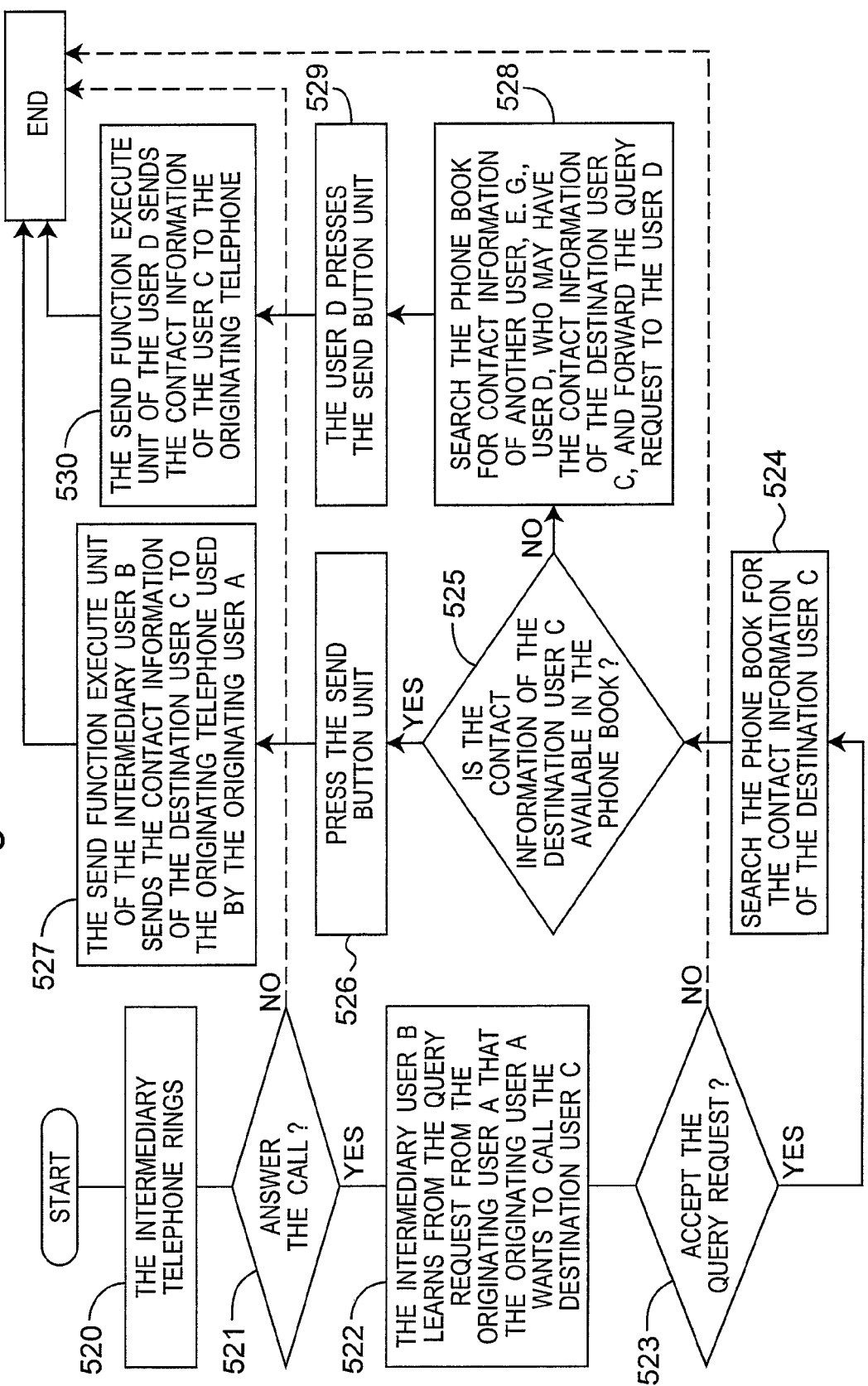
FIG. 8 is a flowchart illustrating the steps an intermediary user B needs to perform in the redirect mode.

Referring to FIGS. 1, 6 and 8, the steps which the intermediary user B needs to execute when the redirect mode of the present invention is selected are as follows. Initially, in step 520, the intermediary telephone 12 used by the intermediary user B rings to notify the intermediary user B of an incoming call. Then, in step 521, the intermediary user B decides whether or not to answer the call. If no, the process is ended. If yes, in step 522, the intermediary user B can learn from the query request from the originating user A that the originating user A wants to call the destination user C. Then, in step 523, the intermediary user B decides whether or not to accept the query request. If no, the process is ended. If yes, in step 524, the intermediary user B uses the phone book of the intermediary telephone 12 to find the contact information of the destination user C. Next, in step 525, it is determined whether the contact information of the destination C is available in the phone book of the intermediary telephone 12. If yes, in step 526, the intermediary user B presses the send button unit 103 of the intermediary telephone 12. Accordingly, in step 527, the send function execute unit 104 of the intermediary telephone 12 sends the contact information of the destination C to the originating telephone 11 used by the originating user A. On the contrary, if the contact information of the destination C is not available in the phone book of the intermediary telephone 12, in step 528, the destination C searches the phone book of the intermediary telephone 12 to find contact information of another user, e.g., user D, who may have the contact information of the destination user C, and forwards the query request to the telephone instrument 10 of the user D. Then, in step 529, the user D presses the send button unit 103 of his/her telephone instrument 10. Accordingly, in step 530, the send function execute unit 104 of the telephone instrument 10 of the user D sends the contact information of the destination C to the originating telephone 11 used by the originating user A.

Figure 9:
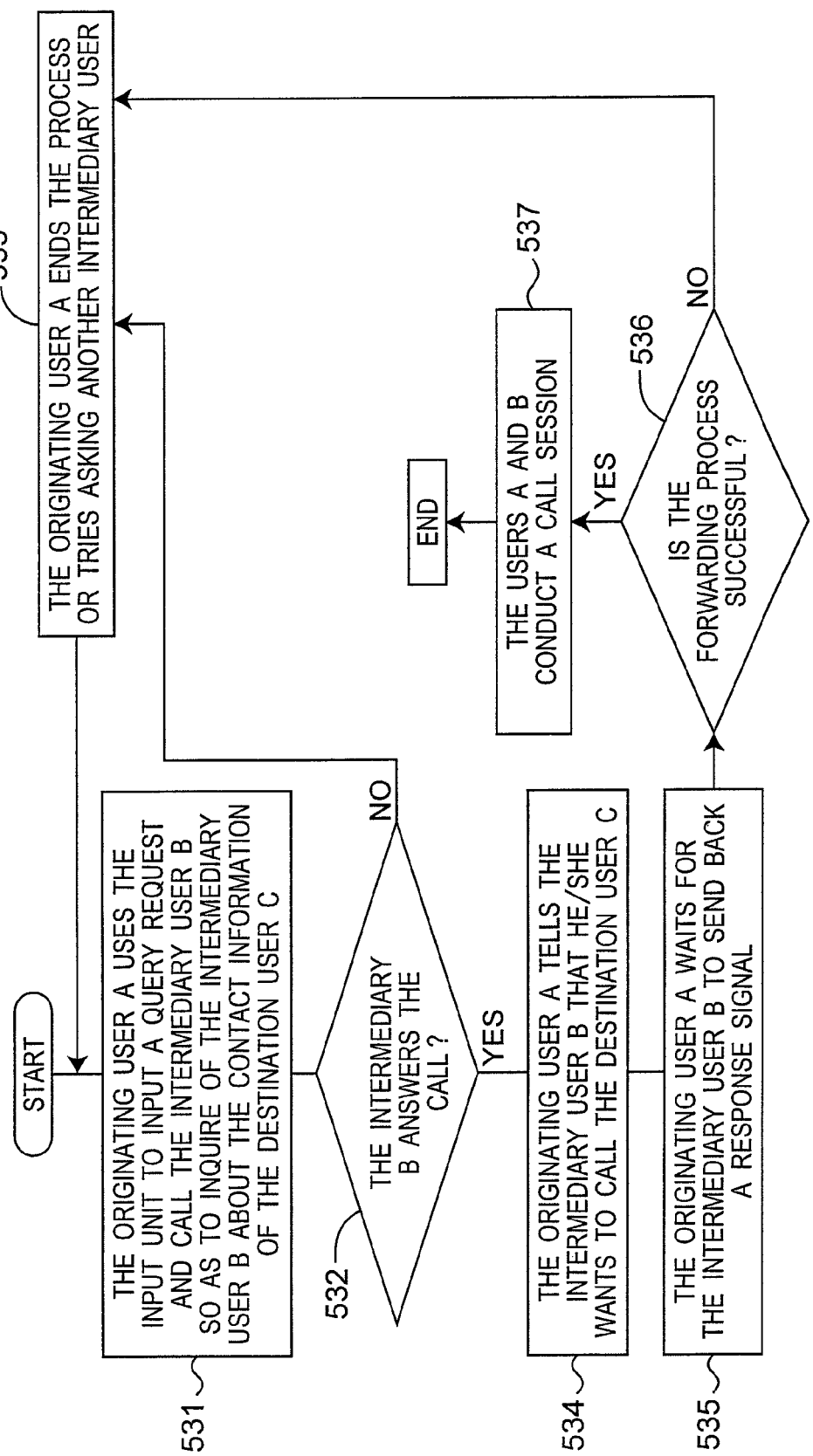
FIG. 9 is a flowchart illustrating the steps the originating user A needs to perform in the forwarding mode.

Referring to FIGS. 1, 6, and 9, the steps which the originating user A needs to execute when the forwarding mode of the present invention is selected are as follows. Initially, in step 531, the originating user A inputs a query request using the input unit 101 of the originating telephone 11, and makes a call to the intermediary user B so as to inquire of the intermediary user B about the contact information of the destination user C. Then, in step 532, the originating user A waits for the intermediary user B to answer the call. If the intermediary user B does not answer the call, in step 533, the process is ended, or the originating user A tries asking another user. If the intermediary user B answers the call, in step 534, the originating user A tells the intermediary user B in the query request that he/she wants to call the destination user C. Next, in step 535, the originating user A waits for a response signal from the intermediary user B. Afterwards, in step 536, the originating user A waits for the forwarding process to be completed. If the forwarding process is unsuccessful, in step 533, the process is ended, or the originating user A tries asking another intermediary user. If the forwarding process is successful, in step 537, the originating users A and C can conduct a telephone conversation smoothly.

Figure 10:
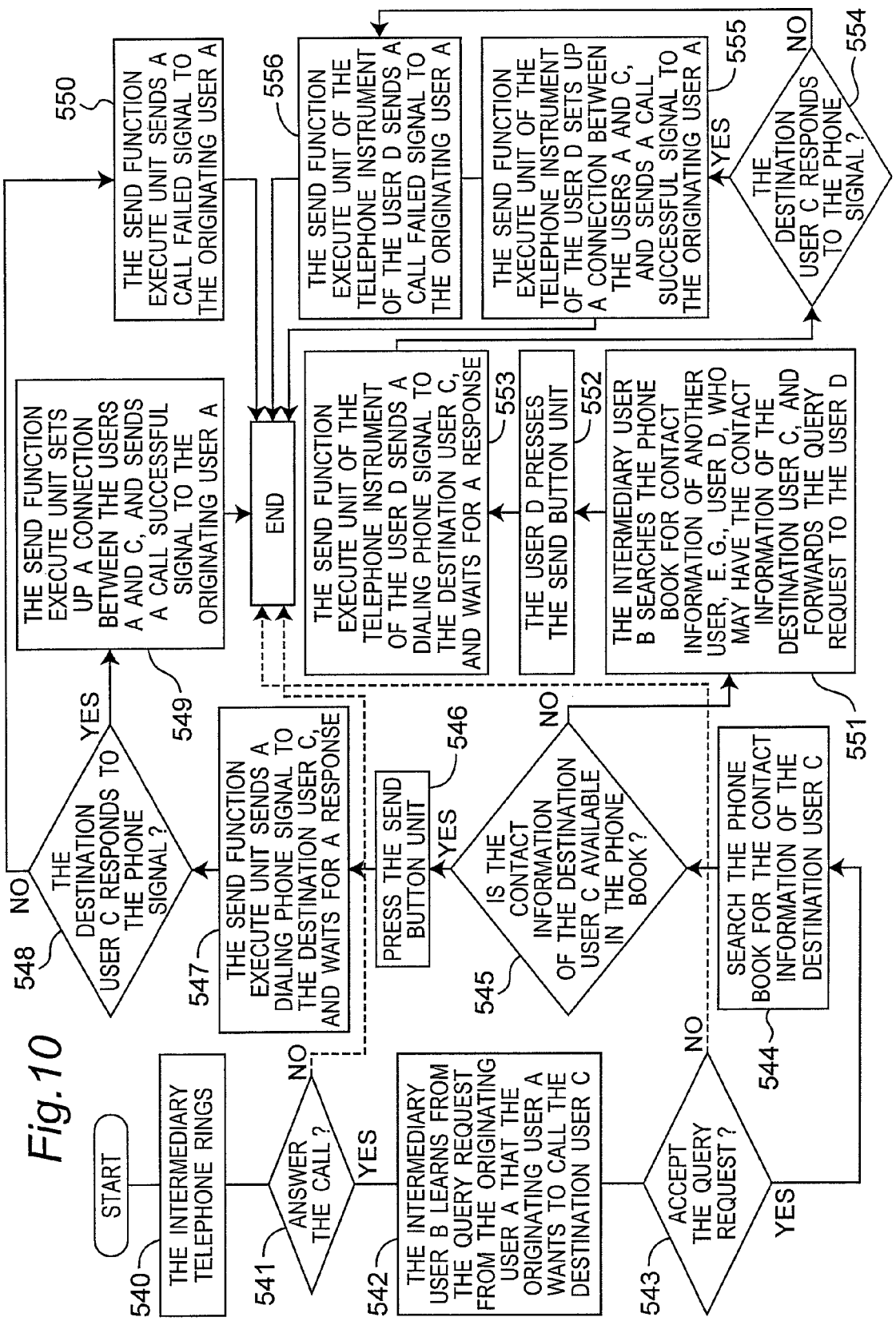
FIG. 10 is a flowchart illustrating the steps the intermediary user B needs to perform in the forwarding mode.

Referring to FIGS. 1, 6, and 10, the steps which the intermediary user B needs to execute when the forwarding mode of the present invention is selected are as follows. Initially, in step 540, the intermediary telephone 12 used by the intermediary user B rings to notify the intermediary user B of an incoming call. Then, in step 541, the intermediary user B decides whether or not to answer the call. If no, the process is ended. If yes, in step 542, the intermediary user B learns from the query request that the originating user A wants to call the destination user C. Afterwards, in step 543, the intermediary user B decides whether or not to accept the query request. If no, the process is ended. If yes, in step 544, the intermediary user B uses the phone book of the intermediary telephone 12 to find the contact information of the destination user C. Then, in step 545, it is determined whether the contact information of the destination C is available in the phone book of the intermediary telephone 12. If yes, in step 546, the intermediary user B presses the send button unit 103 of the intermediary telephone 12 to execute a forwarding function. Accordingly, in step 547, the send function execute unit 104 of the intermediary telephone 12 sends a dialing phone signal to the destination telephone 13 used by the destination C and waits for a response. Then, in step 548, the intermediary user B waits for a response from the destination C to the phone signal. If the destination C responds to the phone signal, in step 549, the send function execute unit 104 of the intermediary telephone 12 sets up a connection between the users A and C, and sends a call successful signal to the originating telephone 11 of the originating user A. If the destination C does not respond to the phone signal, in step 550, the send function execute unit 104 of the intermediary telephone 12 sends a call failed signal to the originating telephone 11 of the originating user A.

On the contrary, in the determination step 545, if the contact information of the destination C is not available in the phone book of the intermediary telephone 12, in step 551, the intermediary user B searches the phone book of the intermediary telephone 12 for another user, such as the user D, who may have the contact information of the destination user C, and forwards the query request to the telephone instrument 10 of the user D. Then, in step 552, the user D presses the send button unit 103 of his/her telephone instrument 10 to execute a forwarding function. Accordingly, in step 553, the send function execute unit 104 of the telephone instrument 10 of the user D sends a dialing phone signal to the destination telephone 13 used by the destination user C, and waits for a response. Next, in step 554, the user D waits for the destination C to respond to the phone signal. If the destination C responds to the phone signal, in step 555, the send function execute unit 104 of the telephone instrument 10 of the user D sets up a connection between the users A and C, and sends a call successful signal to the originating telephone 11 of the originating user A. If the destination C does not respond to the phone signal, in step 556, the send function execute unit 104 of the telephone instrument 10 of the user D sends a call failed signal to the originating telephone 11 of the originating user A.

Figure 11:
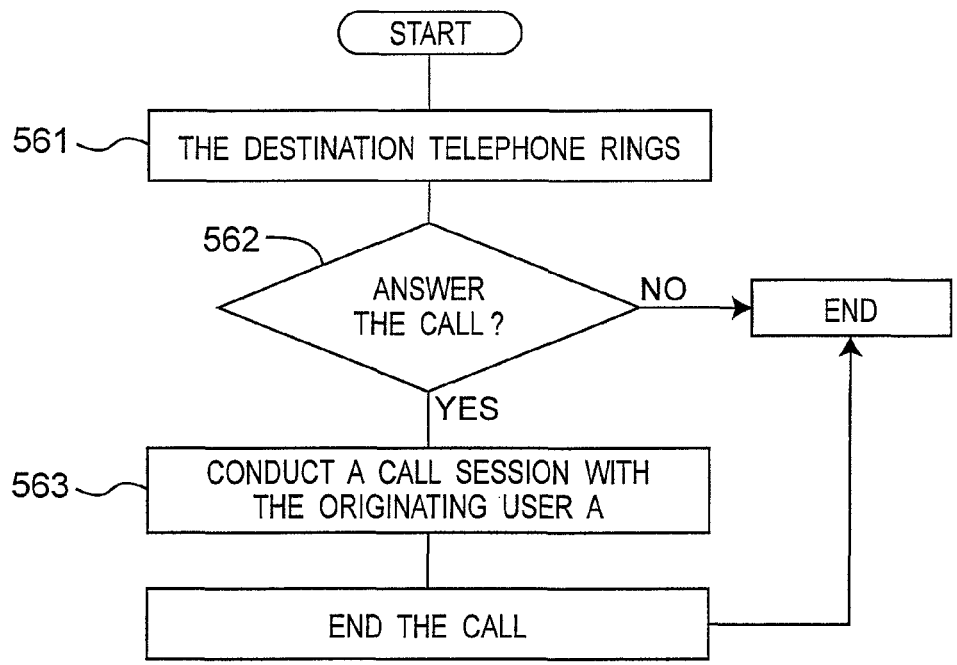
FIG. 11 is a flowchart illustrating the steps a destination user C needs to perform.

Referring to FIGS. 1 and 11, the steps which the destination C needs to execute when the method of the present invention is being carried out are as follows. Initially, in step 561, the destination telephone 13 used by the destination C rings. Then, in step 562, the destination C decides whether or not to answer the call. If no, the process is ended. If yes, in step 563, the destination C can conduct a telephone conversation with the originating user A smoothly.

Figure 12:
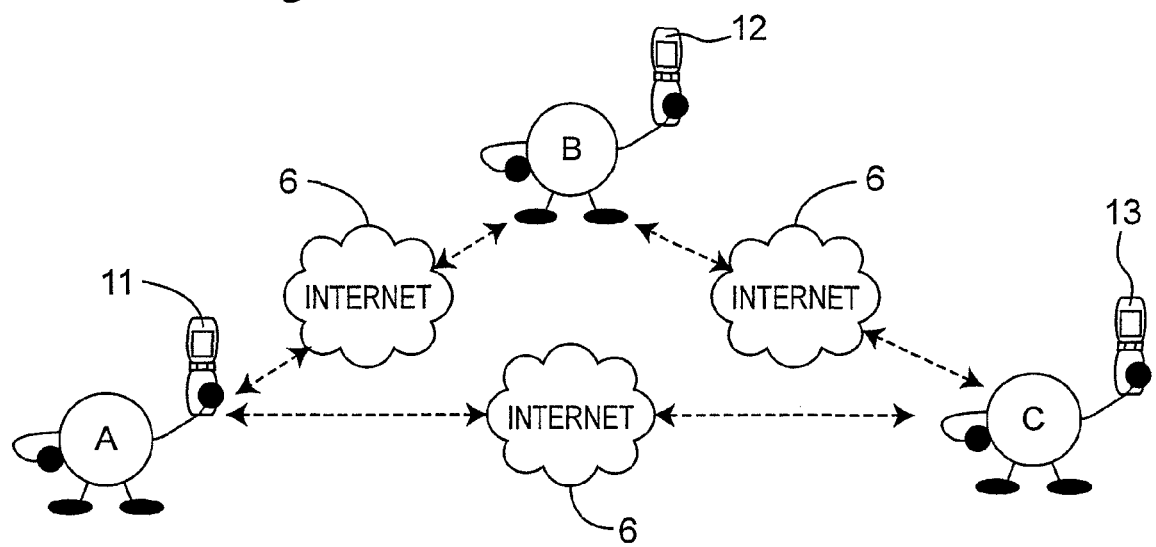
FIG. 12 is a schematic diagram showing a preferred embodiment of the system for enabling originating and destination telephones to conduct a call session through an intermediary telephone according to the present invention.

Referring to FIGS. 6 and 12, the preferred embodiment of a system for enabling originating and destination telephones to conduct a call session according to the present invention can be implemented through the Internet 6, in which the originating telephone 11, the intermediary telephone 12, and the destination telephone 13 can be, e.g., wireless IP phones. Through the Internet 6, any two users can conduct a communication session using the Voice over Internet Protocol (VoIP). The VoIP may be the Session Initiation Protocol (SIP), H.323, etc. Each of the originating telephone 11, the intermediary telephone 12, and the destination telephone 13 has a send (redirect or forward) call function which utilizes phone book searching. When the originating user A wants to call the destination user C, and the contact information of the destination C is not available in the phone book of the originating telephone 11 used by the originating user A, the originating user A can execute the following steps.

First, the originating user A inputs a query request on his/her wireless IP phone (i.e., the originating telephone 11).

Then, the originating user A makes a call (including the query request) to the intermediary user B who may have the contact information of the destination C over the Internet 6. Next, when the intermediary user B receives the query request sent from the originating user A over the Internet 6, the intermediary user B learns that the originating user A wants to call the destination user C. Then, the intermediary user B decides whether or not to accept the query request. If the intermediary user B accepts the query request, he/she searches the phone book of his/her wireless IP phone (i.e., the intermediary telephone 12). If the intermediary user B finds the contact information of the destination C from the phone book of his/her wireless IP phone, he/she presses the send button unit 103 of the wireless IP phone to command the send function execute unit 104 to execute a redirect or forwarding function. If the intermediary user B cannot find the contact information of the destination C from the phone book of his/her wireless IP phone, he/she can forward the query request to another user who may have the contact information of the destination user C. Accordingly, if the execution of the redirect or forwarding function is successful, the users A and C can conduct a call session over the Internet 6.

FIG. 13 shows an example of a request message sent by the originating telephone 11 of the present invention which carries an SIP INVITE request message. The character string of the query request inputted by the originating user A through the originating telephone 11 will be inserted into the SIP INVITE request message in the form of a "Subject" header. For instance, when the originating user A inputs a query code (e.g., Samlee) of the destination C through the originating telephone 11, the "Subject" header in the SIP INVITE request message will contain "Samlee Query Request."

FIG. 14 shows an example of a response message sent by the intermediary telephone 12 of the present invention which carries an SIP REFER response message. When the originating telephone 11 receives the SIP REFER response message, it will parse the contact information of the destination telephone 13 from a "Refer-To" header in the SIP REFER response message. For instance, when the SIP REFER response message carries a "Refer-To" header (e.g., "Refer-To: Samlee<samlee@example2.com>"), the originating telephone 11 makes a call to Samlee (i.e., the destination user C) based on the information in the "Refer-To" header.

In sum, the method for enabling originating and destination telephones to conduct a call session through an intermediary telephone according to the present invention, as well as applications thereof, has the following advantages. First, the originating user A does not need to memorize or write down contact information of the destination user C received from the intermediary user B. Second, the originating user A does not need to manually dial the telephone number of the destination user C received from the intermediary user B, thereby avoiding mis-dialing and thereby reducing telephone charges and calling time.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to the method and system for enabling originating and destination telephones to conduct a call session.

The invention claimed is:

1. A method for enabling originating and destination telephones to conduct a call session through an intermediary telephone, comprising the following steps:
   (a) enabling the originating telephone to send a query request to the intermediary telephone so as to search the intermediary telephone for contact information of the destination telephone; and
   (b) if the contact information of the destination telephone is available in the intermediary telephone, enabling the originating telephone to conduct the call session with the destination telephone using the contact information in the intermediary telephone.

2. The method for enabling originating and destination telephones to conduct a call session through an intermediary telephone according to claim 1, wherein the query request includes a code of the destination telephone.

3. The method for enabling originating and destination telephones to conduct a call session through an intermediary telephone according to claim 1, wherein the contact information includes a telephone number of the destination telephone.

4. The method for enabling originating and destination telephones to conduct a call session through an intermediary telephone according to claim 1, wherein step (a) includes the following sub-steps:
   (a1) inputting the query request through the originating telephone; and
   (a2) using the originating telephone to call the intermediary telephone and to concurrently send the query request to the intermediary telephone so as to search the intermediary telephone for the contact information of the destination telephone.

5. The method for enabling originating and destination telephones to conduct a call session through an intermediary telephone according to claim 1, wherein step (b) includes the following sub-steps:
   (b1) if the contact information of the destination telephone is available in the intermediary telephone, executing a redirect function on the intermediary telephone to enable the intermediary telephone to send the contact information to the originating telephone; and
   (b2) enabling the originating telephone to perform automatic dialing based on the contact information sent from the intermediary telephone so as to conduct the call session with the destination telephone.

6. The method for enabling originating and destination telephones to conduct a call session through an intermediary telephone according to claim 5, wherein the contact information is sent to the originating telephone in a manner selected from the group consisting of SMS, MMS, e-mail, and DTMF.

7. The method for enabling originating and destination telephones to conduct a call session through an intermediary telephone according to claim 1, wherein step (b) includes the following sub-steps:
   (b3) if the contact information of the destination telephone is available in the intermediary telephone, executing a forwarding function on the intermediary telephone to enable the intermediary telephone to automatically hold the connection with the originating telephone and to subsequently and automatically call the destination telephone; and
   (b4) if the intermediary telephone receives a message that the destination telephone has answered the call, setting up a connection between the destination telephone and the originating telephone.

8. A system for enabling originating and destination telephones to conduct a call session through an intermediary telephone, comprising:
   the destination telephone;
   the intermediary telephone having contact information of the destination telephone; and
   the originating telephone for inputting a query request and for calling the intermediary telephone so as to send the query request to the intermediary telephone to search the contact information of the destination telephone from the intermediary telephone, and for conducting the call session with the destination telephone based on the contact information thus found.

9. The system for enabling originating and destination telephones to conduct a call session through an intermediary telephone according to claim 8, wherein the query request includes a code of the destination telephone.

10. The system for enabling originating and destination telephones to conduct a call session through an intermediary telephone according to claim 8, wherein the contact information includes a telephone number of the destination telephone.

11. The system for enabling originating and destination telephones to conduct a call session through an intermediary telephone according to claim 8, wherein the intermediary telephone has a redirect function for enabling the intermediary telephone to send the contact information to the originating telephone so that the originating telephone can automatically call the destination telephone based on the contact information sent from the intermediary telephone.

12. The system for enabling originating and destination telephones to conduct a call session through an intermediary telephone according to claim 11, wherein the contact information is sent to the originating telephone in a manner selected from the group consisting of SMS, MMS, e-mail, and DTMF.

13. The system for enabling originating and destination telephones to conduct a call session through an intermediary telephone according to claim 8, wherein the intermediary telephone has a forwarding function for enabling the intermediary telephone to automatically hold the connection with the originating telephone and to automatically call the destination telephone to thereby set up the call session between the destination telephone and the originating telephone.

14. A telephone instrument, which may be employed as one of an originating telephone and an intermediary telephone in a system including the originating telephone, the intermediary telephone, and a destination telephone, said telephone instrument comprising:
   a processor;
   an input unit, which is used to input a query request sent to the processor of the intermediary telephone when said telephone instrument is used as the originating telephone, wherein the query request is used for inquiring whether contact information of the destination telephone is available in the intermediary telephone;
   a database, which stores the contact information of the destination telephone when said telephone instrument is used as the intermediary telephone;
   a search button unit, which is used to search the database in the intermediary telephone for the contact information of the destination telephone when said telephone instrument is used as the intermediary telephone;
   a display unit, which is used to receive and display the query request from the originating telephone when said telephone instrument is used as the intermediary telephone, and to display the contact information of the destination telephone after searching of the database of the intermediary telephone using the search button unit of the intermediary telephone when said telephone instrument is used as the intermediary telephone;

a communication unit;

a send button unit, which is operable to send a send execute signal when said telephone instrument is used as the intermediary telephone, the send execute signal being one of a redirect execute signal and a forwarding execute signal; and a send function execute unit, which is used to receive the send execute signal from the send button unit when said telephone instrument is used as the intermediary telephone;

wherein, when the send execute signal is the redirect execute signal, said send function execute unit of the intermediary telephone sends the contact information of the destination telephone as stored in said database of the intermediary telephone to the originating telephone through the communication unit of the intermediary telephone, and the send function execute unit of the originating telephone receives the contact information of the destination telephone from the intermediary telephone through the communication unit of the originating telephone, and sends a first dialing phone signal to the communication unit of the originating telephone so as to call the destination telephone based on the contact information of the destination telephone; and wherein, when the send execute signal is the forwarding execute signal, the send function execute unit of the intermediary telephone holds a connection with the originating telephone, obtains the contact information of the destination telephone as stored in the database of the intermediary telephone and as displayed on the display unit of the intermediary telephone, and sends a second dialing phone signal to the communication unit of the intermediary telephone to call the destination telephone, thereby setting up a call session between the destination telephone and the originating telephone.

15. The telephone instrument as claimed in claim 14, wherein the send function execute unit of the originating telephone can further send the contact information of the destination telephone to the database of the originating telephone for storage therein.

16. The telephone instrument as claimed in claim 14, wherein the query request includes a code of the destination telephone.

17. The telephone instrument as claimed in claim 14, wherein the contact information includes a telephone number of the destination telephone.

18. The telephone instrument as claimed in claim 14, wherein the contact information is sent to the originating telephone in a manner selected from the group consisting of SMS, MMS, e-mail, and DTMF.

* * * * *